W. A. HAYDEN.
WHEEL RIM.
APPLICATION FILED OCT. 20, 1919.
1,362,307.
Patented Dec. 14, 1920.
3 SHEETS—SHEET 1.
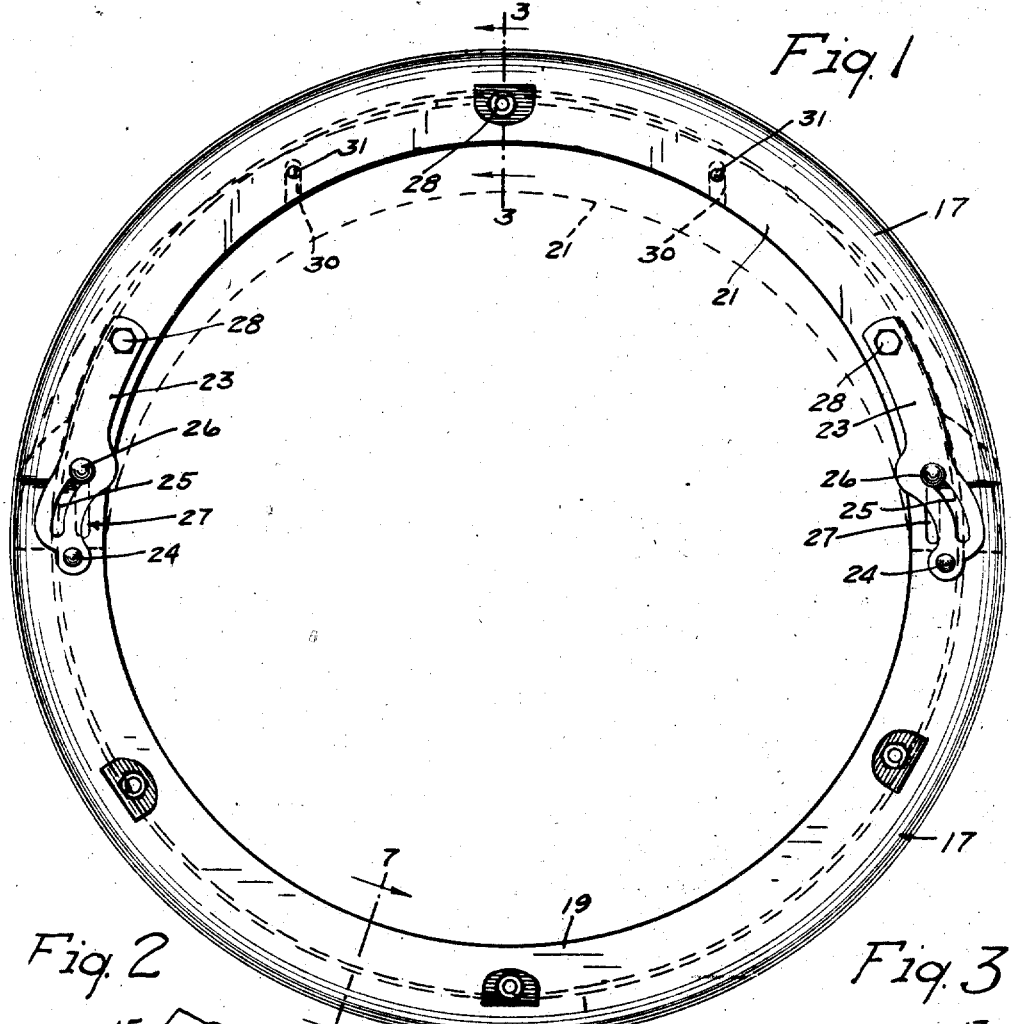
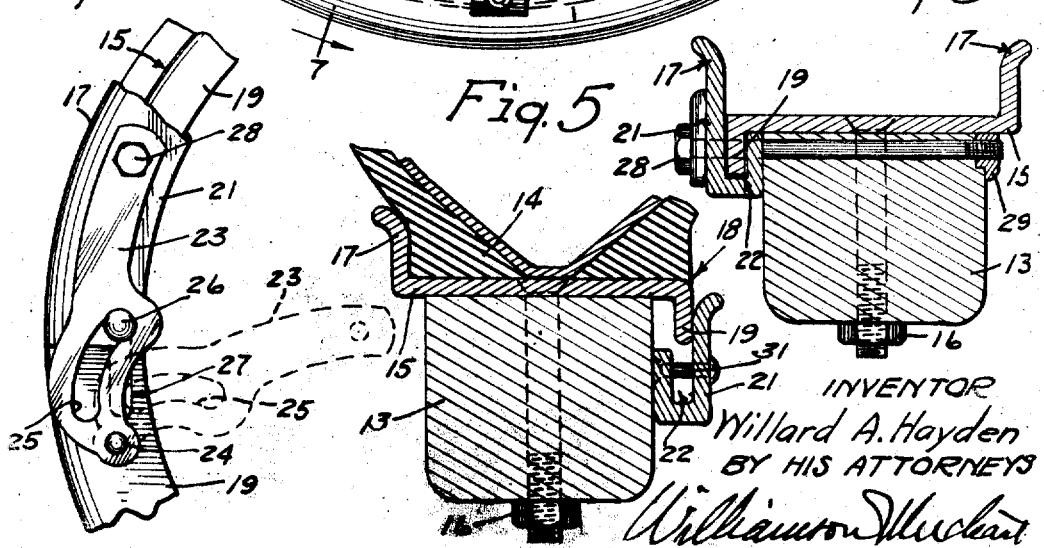
INVENTOR
Willard A. Hayden
BY HIS ATTORNEYS

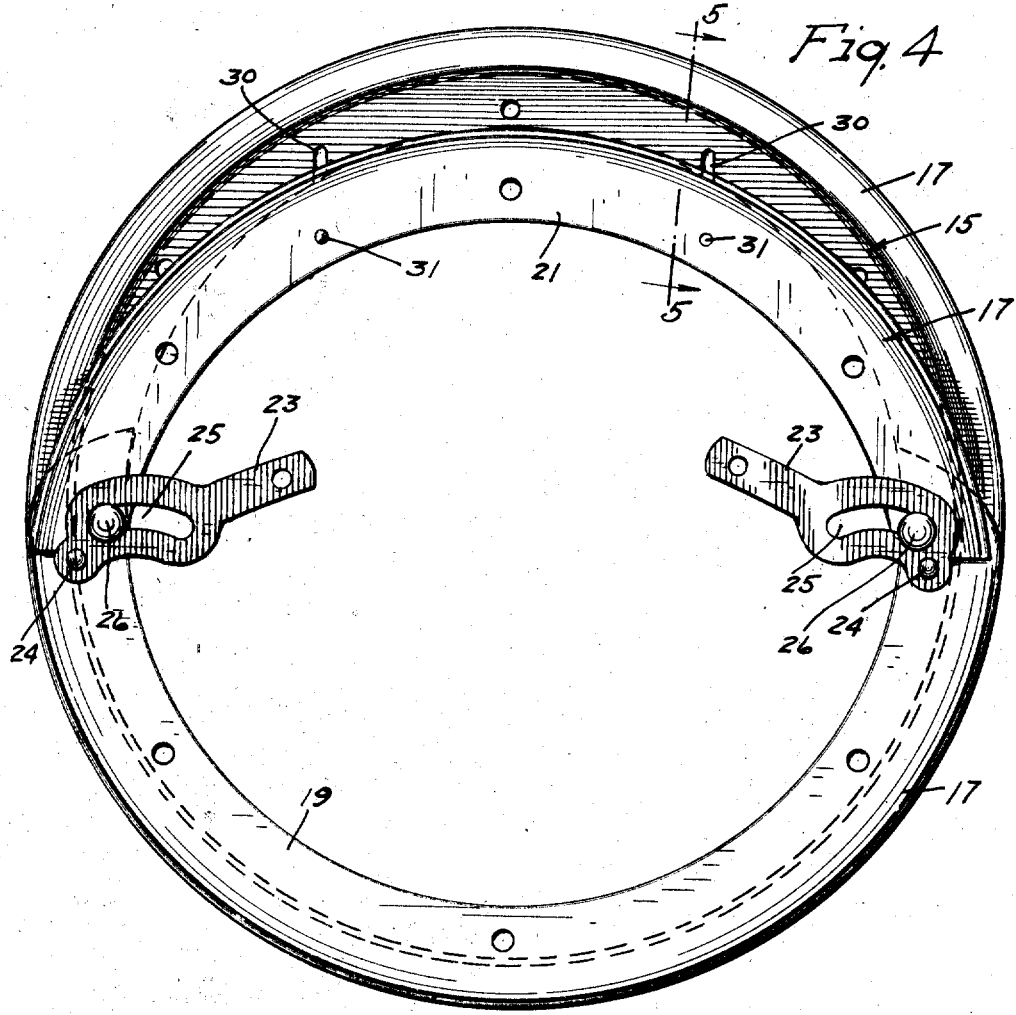
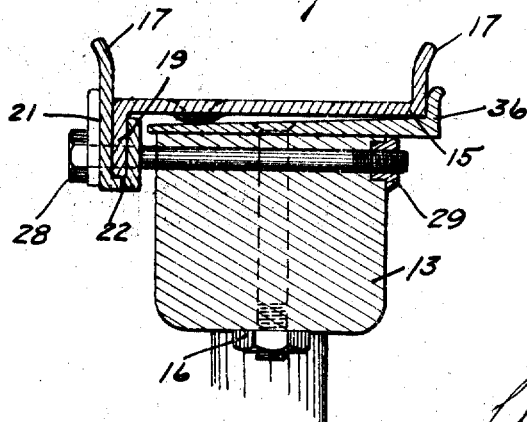
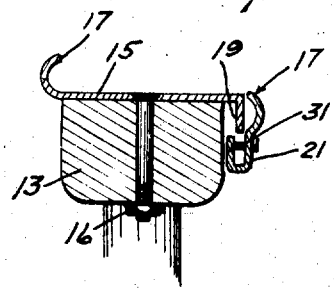

W. A. HAYDEN.
WHEEL RIM.
APPLICATION FILED OCT. 20, 1919.
1,362,307.
Patented Dec. 14, 1920
3 SHEETS—SHEET 3.
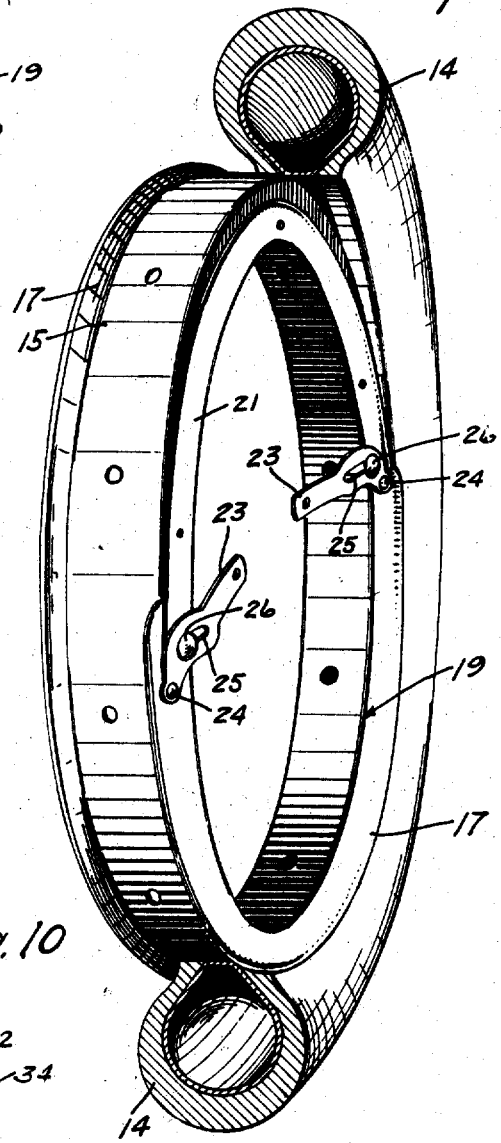
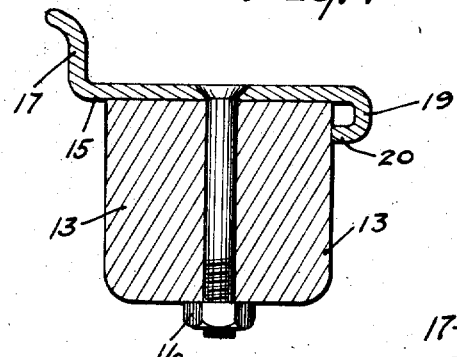
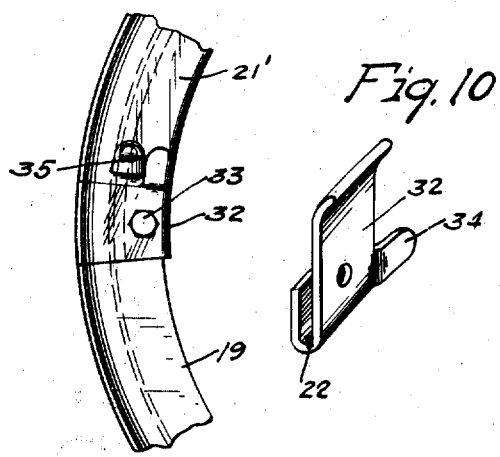
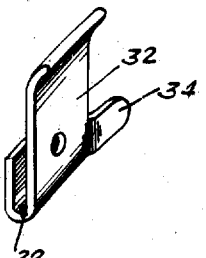
INVENTOR
Willard A. Hayden
BY HIS ATTORNEYS

UNITED STATES PATENT OFFICE.

WILLARD A. HAYDEN, OF MINNEAPOLIS, MINNESOTA, ASSIGNOR TO THE HAYDEN MANUFACTURING COMPANY, OF MINNEAPOLIS, MINNESOTA, A CORPORATION OF MINNESOTA.

WHEEL-RIM.

1,362,307.

Specification of Letters Patent.

Patented Dec. 14, 1920.

Application filed October 20, 1919. Serial No. 331,950.

*To all whom it may concern:*

Be it known that I, WILLARD A. HAYDEN, a citizen of the United States, residing at Minneapolis, in the county of Hennepin and State of Minnesota, have invented certain new and useful Improvements in Wheel-Rims; and I do hereby declare the following to be a full, clear, and exact description of the invention, such as will enable others skilled in the art to which it appertains to make and use the same.

My invention relates to improvements in wheel rims, and more particularly to the wheel rim disclosed and broadly claimed in my co-pending application filed April 24, 1919, under S. N. 292,470.

To the above end, generally stated, the invention consists of the noval devices and combinations of devices hereinafter described and defined in the claims.

In the accompanying drawings, which illustrate the invention, like characters indicate like parts throughout the several views.

Referring to the drawings:—

Figure 1 is an outside elevation of the improved wheel rim, with some parts shown in different positions by means of broken lines;

Fig. 2 is a fragmentary detail view of a portion of the wheel rim as shown in Fig. 1, with some parts shown on an enlarged scale and in different positions by means of broken lines;

Fig. 3 is a detail view in section taken on the line 3—3 of Fig. 1, and also showing a wheel felly to which the improved wheel rim is secured;

Fig. 4 is a view corresponding to Fig. 1, with the exception that the rim section is moved into an inoperative position;

Fig. 5 is a detail view in section taken on the line 5—5 of Fig. 4, and also showing the wheel felly and a pneumatic tire;

Fig. 6 is a perspective view of the wheel rim as shown in Fig. 4, and having a section of the pneumatic tire applied thereto;

Fig. 7 is a detail view in section taken on the line 7—7 of Fig. 1, and also showing the wheel felly to which the rim is secured;

Fig. 8 is a fragmentary perspective view of the improved wheel rim with the tire-retaining flange section removed;

Fig. 9 is a fragmentary outside elevation of the improved wheel rim showing a different method of securing the tire-retaining flange section in an operative position;

Fig. 10 is a perspective view of the filler wedge shown in Fig. 9.;

Fig. 11 is a view corresponding to Fig. 3, but showing the invention incorporated in a demountable rim; and Fig. 12 is a detail view in section showing the invention incorporated in a rim of the clencher type.

Referring first to the invention as shown in Figs. 1 to 8, inclusive, the numeral 13 indicates the felly of an automobile wheel, and the numeral 14 indicates a pneumatic tire having straight sides. The improved wheel rim 15 is continuous and unbroken throughout its entire circumference and width and is rigidly and permanently secured to the felly 13 by nut-equipped bolts 16, the heads of which are countersunk in said rim. Integrally formed with the rim 15 are tire-retaining flanges 17 designed to hold the tire 14.

In the outside tire-retaining flange 17 is a gap 18, which, as shown, has a length equal to substantially one-half of the entire circumference of the rim 15. Also integrally formed with the outside edge of the rim 15 is an inturned flange 19 which, as shown, extends throughout the entire circumference of the rim 15 and is laterally spaced from the felly 13. This flange 19 reinforces the rim 15 at the gap 18 and is preferably made continuous, as shown, to give the rim a symmetrical appearance and to further reinforce the same. Except at the gap 18, the space between the inturned flange 19 and the felly 13 is closed either by turning the flange 19 inward at 20, as shown in Fig. 7, or by inserting a segmental ring section therebetween.

The gap 18 is normally closed by a tire-retaining flange section 21, the other edge portion of which has the same cross section as the tire-retaining flanges 17 and is arranged to slide radially on the outer face of the inturned flange 19. The inner edge portion of the tire-retaining flange section 21 is folded laterally upon itself to afford a channel 22 to receive the inturned flange 19 and thereby secure said tire-retaining flange section against axial movement but with freedom for radial sliding movement. Obviously, the channel portion 22 of the inturned flange 21, together with the flange 20, substantially closes the entire opening between the inturned flange 19 and the felly 13 to prevent mud and dirt from entering therebetween.

The tire-retaining flange section 21 is moved radially to and from an operative position by means of a pair of levers 23 pivoted at 24 to the flange 19. Formed in these levers 23 are cam slots 25, through which extend headed studs 26 rigidly secured to the tire-retaining flange section 21, near the ends thereof, and working in slots 27 formed in the inturned flange 19. The cam slots 25 and studs 26 are arranged to draw the tire-retaining flange section 21 inward when the levers 23 are swung inward, as shown by broken lines in Fig. 2 and by full lines in Fig. 4, and to move said flange section outward into an inoperative position when swung outward, as shown by full lines in Figs. 1 and 2.

To secure the tire-retaining flange section 21 in an operative position, circumferentially spaced bolts 28 are inserted through bores in the sides of the channel 22, flange 19 and felly 13, and have screw-threaded engagement with nuts 29 on the opposite side of said felly from the gap 18. Two of these bolts 28 are also inserted through bores in the free ends of the levers 23 to secure the same in operative positions.

To guide the tire-retaining flange section 21 during its radial movement to and from an operative position, there is formed in the inturned flange 19 a pair of circumferentially spaced notches 30 arranged to receive pins 31 in the form of rivets which extend transversely through the channel 22 and have their ends secured to the sides thereof. These notches 30 and pins 31 also hold the tire-retaining flange section 21 against circumferential movement on the inturned flange 19.

From the above description, it is evident that when the tire-retaining flange section 21 is moved radially inward, as shown in Fig. 4, a pneumatic tire may be readily applied to the improved rim or removed therefrom. It is also evident that the improved rim serves as a felly-band.

Referring now to the construction shown in Figs. 9 and 10, it will be noted that the tire-retaining flange section 21' is of less length than the gap 18 to allow sufficient clearance for a radial movement of said tire-retaining flange section when moved into an inoperative position to permit the application of a tire to the rim or the removal of the same therefrom. To lock the tire-retaining flange section 21' in an operative position, filler wedges or keys 32, having the same cross section as said flange section, are inserted between the adjacent ends of the tire-retaining flange section 21' and the respective tire-retaining flange 17. These filler wedges 32 are secured in position by nut-equipped bolts 33, similar to the bolts 28, inserted through bores in the sides of the channels in said filler wedges, flange 19 and felly 13. Integrally formed with the filler wedges 32 are lips 34 which overlap the ends of the tire-retaining flange section 21' and hold the same against lateral movement from the felly 13. Formed on the tire-retaining flange section 21', near the ends thereof, are lugs 35 which may be struck by a hammer or other tool to move the tire-retaining flange section 21' either inward or outward in case the same should stick or bind.

The construction shown in Fig. 11 is the same as that shown in Fig. 3, with the exception that the invention is incorporated in a demountable rim and the felly 13 is provided with a flanged band 36 to receive the demountable rim by an axial movement.

The construction shown in Fig. 12 corresponds to that shown in Fig. 3, with the exception that the tire-retaining flange 17 on the rim 15 and the tire-retaining flange section 21 are designed to hold a clencher tire.

What I claim is:—

1. A continuous unbroken wheel rim having integral tire-retaining flanges, in one of which is a gap, a tire-retaining flange section for closing said gap and movable out of the gap by an inward radial movement while maintaining its normal form, and means securing the tire-retaining flange section outward of the wheel rim.

2. A continuous unbroken wheel rim having tire-retaining flanges, in one of which is a gap, an inturned flange on the wheel rim at said gap, a tire-retaining flange section for closing the gap and having a channel portion arranged to receive the inturned flange to lock the tire-retaining flange section against axial movement but with freedom for radial movement while maintaining its normal form.

3. A continuous unbroken wheel rim having tire-retaining flanges, in one of which is a gap, a tire-retaining flange section for closing said gap, means securing the tire-retaining flange section outward of the wheel rim with freedom for radial movement while maintaining its normal form, and cam-acting levers for moving the tire-retaining flange section to and from an operative position.

4. A continuous unbroken wheel rim having tire-retaining flanges, in one of which is a gap, a tire-retaining flange section for closing said gap, means securing the tire-retaining flange section outward of the wheel rim with freedom for radial movement while maintaining its normal form, cam-acting levers for moving the tire-retaining flange section to and from an operative position, and bolts adapted to be inserted through openings in the levers, tire-retaining flange section and inturned flange for securing said levers and tire-retaining flange section in operative positions.

5. A continuous unbroken wheel rim having tire-retaining flanges, in one of which is a gap, an inturned flange on the wheel rim at said gap, a tire-retaining flange section for closing the gap and having a channel portion arranged to receive the inturned flange to lock the tire-retaining flange section against axial movement but with freedom for radial movement while maintaining its normal form, a notch in the inturned flange, and a member in the channel of the tire-retaining flange section extending into said notch for guiding said tire-retaining flange section to and from an operative position.

6. The combination with a wheel felly and a rim therefor, said rim having tire-retaining flanges, in one of which is a gap, an inturned flange on the rim at said gap and spaced apart from the wheel felly, a tire-retaining flange section for closing the gap and having a channel arranged to receive the inturned flange, to lock the tire-retaining flange section against axial movement, but with freedom for radial movement.

7. The combination with a wheel felly and a rim therefor, said rim having tire-retaining flanges, in one of which is a gap, an inturned flange on the rim at said gap and spaced apart from the wheel felly, a tire-retaining flange section for closing the gap and having a channel arranged to receive the inturned flange, to lock the tire-retaining flange section against axial movement, but with freedom for radial movement, and a bolt adapted to be inserted through openings in the sides of the channel portion of the tire-retaining flange section, inturned flange and wheel felly to secure said tire-retaining flange section in an operative position.

In testimony whereof I affix my signature in presence of two witnesses.

WILLARD A. HAYDEN.

Witnesses:
 WINIFRED I. WARD,
 HARRY D. KILGORE.